United States Patent [19]

Kuehn

[11] 4,073,848
[45] Feb. 14, 1978

[54] SYNTHETIC SLATE

[75] Inventor: Melvin C. Kuehn, Grand Rapids, Minn.

[73] Assignee: Ormite, Inc., Grand Rapids, Minn.

[21] Appl. No.: 752,921

[22] Filed: Dec. 21, 1976

Related U.S. Application Data

[62] Division of Ser. No. 576,750, May 12, 1975, Pat. No. 4,038,242.

[51] Int. Cl.² .............................................. B29G 1/01
[52] U.S. Cl. .............................. 264/120; 51/298 R; 264/122; 264/331
[58] Field of Search ................. 51/298; 264/120, 331; 260/39 R

[56] References Cited

U.S. PATENT DOCUMENTS

| | | | |
|---|---|---|---|
| 2,841,565 | 7/1958 | Barnstein | 260/39 R |
| 3,093,464 | 6/1963 | Coes | 51/298 |
| 3,257,491 | 6/1966 | Smits | 264/331 |
| 3,450,808 | 6/1969 | Roberts | 264/120 |

Primary Examiner—Edward J. Smith
Attorney, Agent, or Firm—Pennie & Edmonds

[57] ABSTRACT

A solid, slate-like product, a composition and method of producing the same comprising a substantially uniform mixture of at least five parts by weight of a finely divided taconite iron ore material containing at least about 1 percent magnetite therein and an amine-formaldehyde resin such as urea-formaldehyde or melamine-formaldehyde. The mixture, heated under pressure, forms a dense slate-like material.

10 Claims, 5 Drawing Figures

SYNTHETIC SLATE

This is a division of application Ser. No. 576,750, filed May 12, 1975, now U.S. Pat. No. 4,038,242.

BACKGROUND OF THE INVENTION

Taconite ore is a lean iron ore material extensively found in the Lake Superior region of the United States. The ore is generally composed of up to about 1 percent iron silicate, about 1 to 10 percent magnetite, about 1 to 30 percent hematite, and the remainder consisting primarily of quartz. Taconite rock is usually mined by open pit methods. It is then pulverized and the granulated material is subjected to magnetic extraction. The resultant tailings have been considered to be of little or no value, particularly since further extraction of the residual iron materials still contained therein is economically unfeasible. As a result, the taconite tailings have been discarded by depositing them into natural waterbodies, artificial ponds, etc. and have heretofore been a major source of pollution.

On the other hand, various organic resins have been used extensively in molding operations. These resins include those materials which are capable of undergoing further polymerization or polyaddition reactions during the molding process. The resins are normally mixed with fillers, dilutents, plasticizers, and/or other auxiliary agents. These agents include various organic compounds or polymers as well as various inorganic compounds, such as glass, carbon, metals, metal oxides or metal salts. The particular additives used are generally dependent upon the ability of the resin to incorporate the additive and the end product desired. Such compositions have been known in which the filler is the dominant component and these compositions have normally resulted in products which have a relatively low density or are easily friable. These compositions are so highly filled that it has been found that products formed from these materials would not be capable of withstanding large forces or stresses. In many instances they would not be of sufficient strength to support bending forces due to their own weight.

I have found that taconite iron ore material, particularly tailings which contain at least one percent (1%) magnetite therein, can be converted into a useful composition, the physical properties of which so nearly resemble natural slate that end use products previously made of natural slate can now be molded of my inventive composition.

SUMMARY OF THE INVENTION

The composition of this invention requires the utilization of taconite iron ore material in finely divided form as the major component and forms a hard solid, dense product which is not friable and is resistant to fracture. The resultant product has similar properties and appearance as is associated with natural slate and can be used as a substitute for natural slate in such applications as building construction, decorative materials, underlayers for billiard tables and the like, grinding wheels, etc. In addition, the capability to mold the material to predetermined shapes and configurations makes its end use capability even greater than that of natural slate. The product can be readily formed by substantially uniformly mixing an amine-formaldehyde resin, preferably selected from urea-formaldehyde or melamine-formaldehyde with at least five parts, per part of resin, of taconite iron ore material having at least 1 percent magnetite therein. The mixture can be readily molded into a desired dense slate-like material.

As will be seen in the description which follows, by forming the end product under prescribed temperatures and pressures, the material will assume substantially the physical properties of natural slate. For example, while natural slate has an average density of approximately 0.28 lbs/in$^3$, the present inventive composition has been found to have an average density of about 0.25 lbs/in$^3$. Hardness of the present composition has been found to be about 49 (averaging 45–60) on the Rockwell C scale while the hardness of natural slate is about 54. In addition, by maintaining the forming pressures at substantial levels such as, for example, within the range of from 100 psi to 500 psi, while providing an intermediate "breathing" step to permit the removal of gaseous substances during the casting process, internal imperfections may be eliminated and maximum product density may be achieved.

Further, by preferably maintaining the fineness of the taconite material at a level which will pass through a screen having a fineness of at least 100 mesh (Tyler) — and preferably from about 100 mesh to 400 mesh — the density and property characteristics approaching those of natural slate are more nearly achieved. However, it should be noted that while a particle fineness of about 100 mesh is desirable to produce a product having physical properties approaching those of natural slate, nevertheless, the practice of the invention only requires that the taconite material be in a finely divided state and particle sizes coarser than 100 mesh (Tyler) — such as 35 mesh (Tyler) — may be used with the result that the final product would be usable for grinding wheels, construction materials and the like, but will not have physical properties as closely related to natural slate as the composition utilizing particles of at least 100 mesh (Tyler) size.

DETAILED DESCRIPTION OF THE INVENTION

Figure 1:
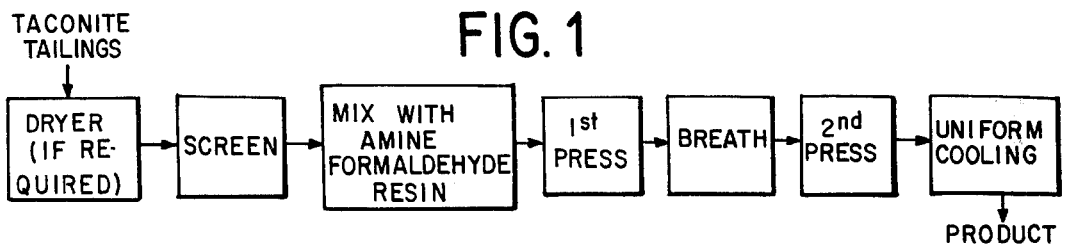
FIG. 1 is a schematic representation illustrating the steps of the method of the present invention.

It has now been found that a slate-like material can be formed from a composition comprising at least five parts by weight of a finely divided iron ore material containing therein at least about one percent magnetite, and one part by weight of an amine-formaldehyde resin selected from urea-formaldehyde or melamine formaldehyde.

Taconite iron ore is mined extensively in the Lake Superior region of the United States. Normally the ore is a mixture of iron containing materials which generally contain magnetite mixed with hematite. Magnetite is the natural grey oxide of iron associated with the chemical formula $Fe_3O_4$. Hematite is the more common red oxide of iron, $Fe_2O_3$.

In the production of iron, magnetite-containing iron ore, such as taconite, is normally pulverized and then subjected to magnetic action to remove as much of the iron materials as possible. The resultant waste tailings — which still contain relatively small amounts of magnetite and hematite — are generally discarded. The tailings generally have from about 1 to 15 percent iron compounds which have not been removed by the extraction process. The composition of the tailings generally comprises up to about one percent iron silicate, about 1 to 5 percent magnetite, about 1 to 10 percent hematite with the remainder being predominantly quartz.

The composition of the present invention is made from iron ore material containing therein at least one percent, and preferably from 1 to 5 percent, of magnetite. Taconite material is the preferred material because the magnetite is naturally occurring therein. Further, taconite tailings are the most preferred material particularly because of their ready accessibility and low cost. In addition to the presence of magnetite in the iron ore material used, the material should further be in the form of finely divided particles preferably of a size which is capable of passing through a 100 mesh (Tyler) screen with a particle size range of from about 100 mesh to 400 mesh being preferred. However, particles of greater size rangin to about at least 35 mesh (Tyler) may also be utilized with the resultant product having a coarser — or even a decorative — appearance.

At least 5 parts by weight, per part of resin, of the iron ore material should be present in the composition. However, the composition may contain up to about 12 parts by weight of iron ore material. It is preferred that from 5 to 12 parts by weight of taconite material be used with a melamine resin disclosed hereinbelow and from 7 to 12 parts by weight of taconite material be used when a urea-formaldehyde resin is a part of the composition.

The precondensate resins useful herein are the amine-formaldehyde resins of melamine-formaldehyde or urea-formaldehyde. These specific resins have been found to be uniquely suitable for yielding the hard, dense, slate-like material of the subject invention when used in combination with the taconite ore material as disclosed. The useful melamine-formaldehyde resins are solid, commercially available products having a formaldehyde to melamine ratio in the range of from about 1.7:1 to 6:1; however, resins with ratios of from 2:1 to 3.5:1 are preferred. The urea-formaldehyde resins useful herein are commercially available products having a formaldehyde to urea ratio of from about 1.2:1 to 2:1 with a ratio of from about 1.5:1 to 1.8:1 being preferred.

It should be noted that the cure time of compositions containing urea-formaldehyde can be enhanced by the addition of an organic flour such as walnut shell flour, cashew nut shell flour, wheat flour and the like, in amounts of up to about 1 part by weight per part of resin. Also, compositions formed from melamine-formaldehyde can be enhanced by the addition of up to about 1 part, and preferably 0.25 to 1.00 part, by weight per part resin, of an aqueous alkali metal silicate solution. The alkali metal silicate, such as sodium or potassium silicate, are normally present in such solutions as mixtures of the mono, di, tri, tetra, and penta silicates. The solution may be of any concentration although the amount of water should be held to the minimal necessary proportion to allow the materials to be processed into a substantially homogeneous mixture. It has been found that 40 to 50 percent solutions are useful. In addition, catalytic amounts of basic materials, such as $NH_4SO_4$, $NH_4Cl$, $MgSO_4$ and the like may also be added to the mixtures to enhance the rate of cure.

The preferred product of the present invention is formed by initially passing the iron ore material through a screen to select suitable finely divided particles. If the particulate materials are in a water vehicle, they are dried to contain less than 10 percent and preferably less than 3 percent moisture. This drying operation can be done in any known conventional manner such as by subjecting the material to heat in a forced air oven. In the preferred form the taconite iron ore material is screened to a fineness of at least 100 mesh (Tyler) particle size and then substantially uniformly mixed with the appropriate amine-formaldehyde resin and the appropriate filler materials, such as organic flour or alkali metal silicate, as discussed hereinabove. Preferably the taconite iron ore materials and the resin are mixed together in a high-shear mixer of a type known to those skilled in the art as for example, a Pony Mixer or a sigma blade mixer, to form a substantially uniform mixture.

Figure 2:
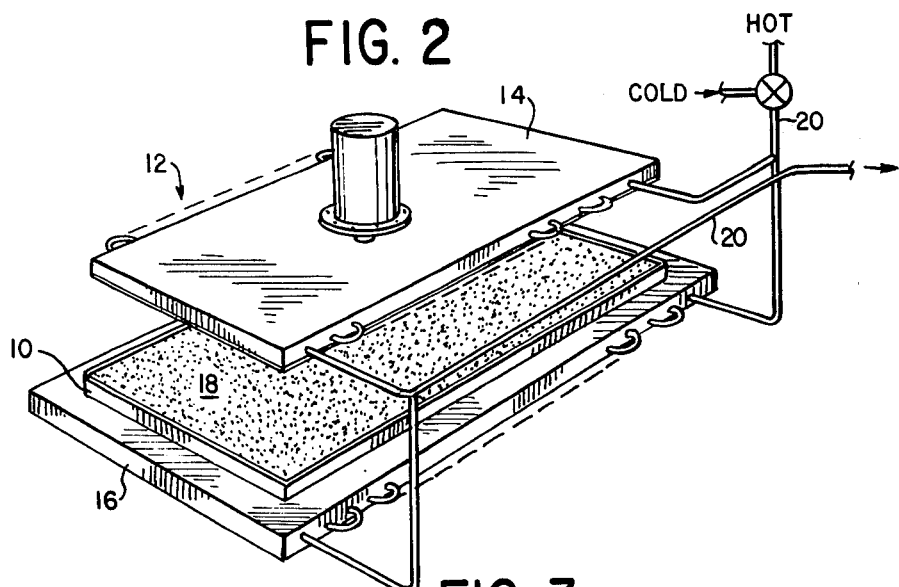
FIG. 2 is a perspective view of an apparatus for molding a solid slate-like composition according to the invention.

Referring now to FIG. 2, the mixture 18 is then introduced into a suitable molding apparatus 12 having an upper platen 14 and a lower platen 16, and initially subjected to a temperature in the range of from about 200° F. to 300° F. at a minimum pressure of about 100 psi. Pressures of from 300 psi to 500 psi produce superior results and even higher pressures can be used to further increase the density and strength of the final product. The gaseous substances formed during this initial curing step are allowed to escape from the molded composition by withdrawing upper platen 14 to relieve the pressure on the mold for a short period of time. After the molded mixture is substantially free of the gaseous formations, the upper platen 14 is once again lowered and the composition is subjected to a temperature of from about 275° F. to 400° F. at the elevated pressure previously used. When a urea-formaldehyde resin is used the temperatures should normally be maintained at less than 325° F.; however, the length of time at which the initial and final cure steps are allowed to occur are not critical. Although the time period for the initial molding step need only be sufficient to cause the formation of the gaseous substances, nevertheless, the final molding step should be of a time sufficient to cause curing the composition to form an integral molded product.

Heating of the platens is achieved by any known means and preferably either electrically or by directing a heated liquid material through the tubes 20 so as to heat the mixture to the required temperature. If a heated liquid is used, it must be capable of withstanding the operating temperatures without decomposition. I have found that a liquid such as peanut oil is capable of suitably heating the mixture to the required temperatures while being capable of being recycled through the molding apparatus. Also, cooling of the mixture in the mold may be achieved by any known means but is preferably achieved by directing a cooling liquid through the tubes 20 shown in FIG. 2. Where substantial accuracy and minimum warpage of the final product is necessary or desirable — as for billiard table tops, etc. — the heating and cooling are preferably accomplished as uniformly as possible, and this uniformity may be achieved by distributing the heating and cooling means substantially uniformly with respect to the molding apparatus.

Figure 3:
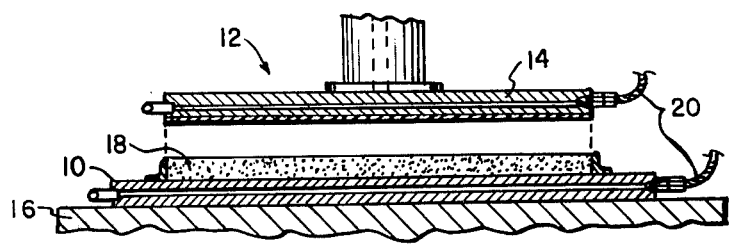
FIG. 3 is a cross-sectional view of the apparatus of FIG. 2.
Figure 4:
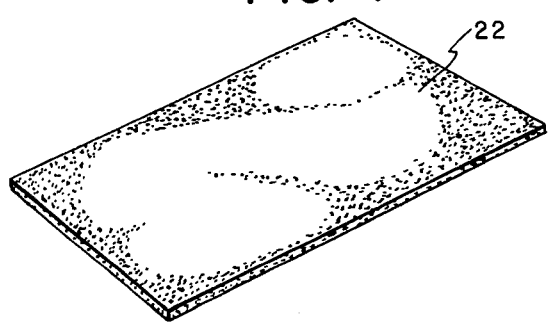
FIG. 4 is a perspective view of a solid slate-like product molded to a rectangular configuration for use as a suitable replacement for a slab of natural slate material.
Figure 5:
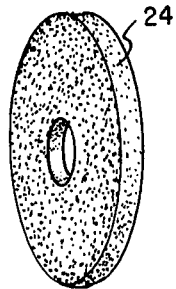
FIG. 5 is a perspective view of a grinding wheel molded from the solid slate-like composition of the invention and illustrating a typical end use therefor.

The composition of this invention can be formed into any desired shape and has been found to be a superior substitute for natural slate. The products formed by the present composition are non-porous and resistant to abrasion and water absorption and have substantially the same hardness and density as natural slate and can withstand their own weight even when the material is molded into large sheets to be supported in a horizontal position. Examples of products which can be formed from the composition of this invention are illustrated in FIGS. 3 and 4 wherein a slate-like slab 22 and a grinding wheel 24 are respectively illustrated. The coarseness of the grinding wheel is controllable by selectively varying the particle size of the taconite material used in the mixture. Other useful end products include: household and decorative items such as table tops and the like; construction articles such as shingles, tiles and the like; underlayer sheet materials of the type required for pooltable beds, etc.

The following examples are set forth for the purposes of illustration only and are not to be construed as limitations of the present invention except as set forth in the appended claims.

EXAMPLE I 5 parts of taconite tailings, analyzed as 2% magnetite, 3% hematite and 0.5 percent iron silicate as the iron containing components were passed through a series of standard (Tyler) mesh screens. Material having a mesh size of from 100 to 400 were collected and introduced into a pony mixer. 1 part of an aqueous solution of urea-formaldehyde resin having 60 percent resin (BORDENS CR-585) with a 1.7:1 ratio of formaldehyde to urea and 0.25 parts of walnut shell flour (BORDENS FM-142) was introduced into the mixture. The mixture was a substantially uniform viscous mass at the end of 30 minutes.

The mixture was placed in a molding apparatus comprising a rectangular mold which was placed in a hydraulic press equipped with upper and lower heating plates. The mold composition was subjected to 300 psi at 250° F. for about 15 minutes. The pressure was released and the gaseous products were removed. The mold composition was then subjected to 300 psi at 325° F. for 25 minutes. The mold composition was uniformly cooled by just maintaining contact between the press's heating plates while they were cooling. When the press plates and the mold composition reached 100° F., the molded product was removed. The product obtained was a hard dense slate-like material having a density of 0.25 lbs/in$^3$ (slate = 0.28 lbs/in$^3$) and a measured hardness (Rockwell C) of 45–60 (slate hardness average 54).

EXAMPLE II

A slate-like product was produced in the same manner as described in Example I except the taconite talings analyzed 4.5% magnetite, 6% hematite, 0.5% iron silicate and the remainder as quartz products. The resultant product was substantially the same as obtained in Example I.

In comparison, a product was made from taconite tailings containing 0.5% magnetite. The product has a much lower density and hardness and could not be used as a substitute for slate.

EXAMPLE III

A slate-like product was made in the same manner as described in Example I except various urea-formaldehyde resins were used. The resins were each 60% solid solutions having formaldehyde to urea ratios of 1.6:1 and 1.8:1. The product was substantially the same as previously described.

EXAMPLE IV

A slate-like product was made in the same manner as described in Example I except 4 parts taconite tailings were used (6.7 parts taconite to 1 part resin). The product had a density of 0.245 lbs/in$^3$ and a hardness (Rockwell C) of 47.

EXAMPLE V

A slate-like product was made in the same manner as Example I except the walnut shell flour was not used. The total heating cycle took about 5 hours but a product substantially similar to that described in Example I was produced.

EXAMPLE VI

A slate-like product was made in the same manner as Example I except the taconite material was passed through a screen of 35 mesh (Tyler). The resultant product had a coarser appearance than that of Example I, but was usable for grinding wheels, construction materials, and the like and to some extent had a decorative rough surface.

EXAMPLE VII

Six parts of taconite tailings described in Example I above was mixed with 1 part of a solid melamine-formaldehyde resin having a formaldehyde to melamine ratio of 4:1 (AMERICAN CYANAMID CYMEL 401) and with 1 part of a 40% solution of sodium silicate (averaging NaO 3SiO$_2$). The materials were mixed in a pony mixer until substantially uniform and then transferred to a rectangular mold 36 × 60 ins. The mold was subjected to the temperature and pressures described in Example I above. The resultant product had a density of 0.26 lbs/in$^3$ and a hardness (Rockwell C) of 59. The material was capable of sustaining its own weight while in the horizontal position.

EXAMPLE VIII

A slate-like product was made in substantially the same manner as described in Example VI except 9 parts of tailings were used. The final product was substantially the same as described in Example VI.

EXAMPLE IX

A slate-like product was made in the same manner as Example VI except that the final cure temperature was raised to 400° F. The final product was substantially the same as described in Example VI above.

EXAMPLE X

A slate-like product was made in the same manner as Example VII except the taconite material was passed through a screen of 35 mesh (Tyler). The resultant product had a coarser appearance than that of Example VII, but was usable for grinding wheels, construction materials, and the like and to some extent had a decorative rough surface.

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

What is claimed is:

1. A method of producing a solid dense synthetic slate-like material comprising:
    (a) mixing at least 5 parts by weight of a finely divided taconite iron ore material which contains at least about 1 percent magnetite therein with about 1 part by weight of an amine-formaldehyde resin precondensate to form a substantially uniform mixture;
    (b) casting the mixture into a vessel;
    (c) preheating under pressure said mixture to a temperature from about 200° F. to 300° F. for a period of time to cause formation of gaseous products;
    (d) removing said gaseous products;
    (e) heating the mixture to a temperature of from about 275° F. to 400° F. under pressure to cause solidification of the mixture; and
    (f) cooling the formed solid product.

2. The method according to claim 1 in which the amine-formaldehyde resin is selected from urea-formaldehyde or melamine-formaldehyde.

3. The method according to claim 2 in which the finely divided taconite iron ore material is of at least a 100 mesh (Tyler) particle size.

4. The method according to claim 2 in which the finely divided taconite iron ore material is of at least a 35 mesh (Tyler) particle size.

5. The method of claim 2 further comprising cooling the solid product substantially uniformly.

6. The method of claim 5 in which the taconite iron ore material is taconite iron ore tailings containing at least 1 to 5 percent magnetite therein.

7. The method of claim 6 in which the mixture contains 5–12 parts by weight of tailings, 1 part by weight melamine-formaldehyde precondensate and about 0.25 to 1.00 parts by weight of alkali metal silicate.

8. The method of claim 6 in which the mixture contains 5–12 parts by weight taconite tailings, 1.00 part by weight melamine-formaldehyde precondensate and about 0.25 to 1.00 part sodium silicate.

9. The method of claim 6 in which the mixture contains about 5–12 parts by weight taconite iron ore material, 1 part by weight of an urea-formaldehyde precondensate, and up to 1 part by weight of an organic flour.

10. The method of claim 5 in which the preheating and heating steps are preformed while the mixture is under pressure from about 100 psi to about 500 psi.

* * * * *